United States Patent Office.

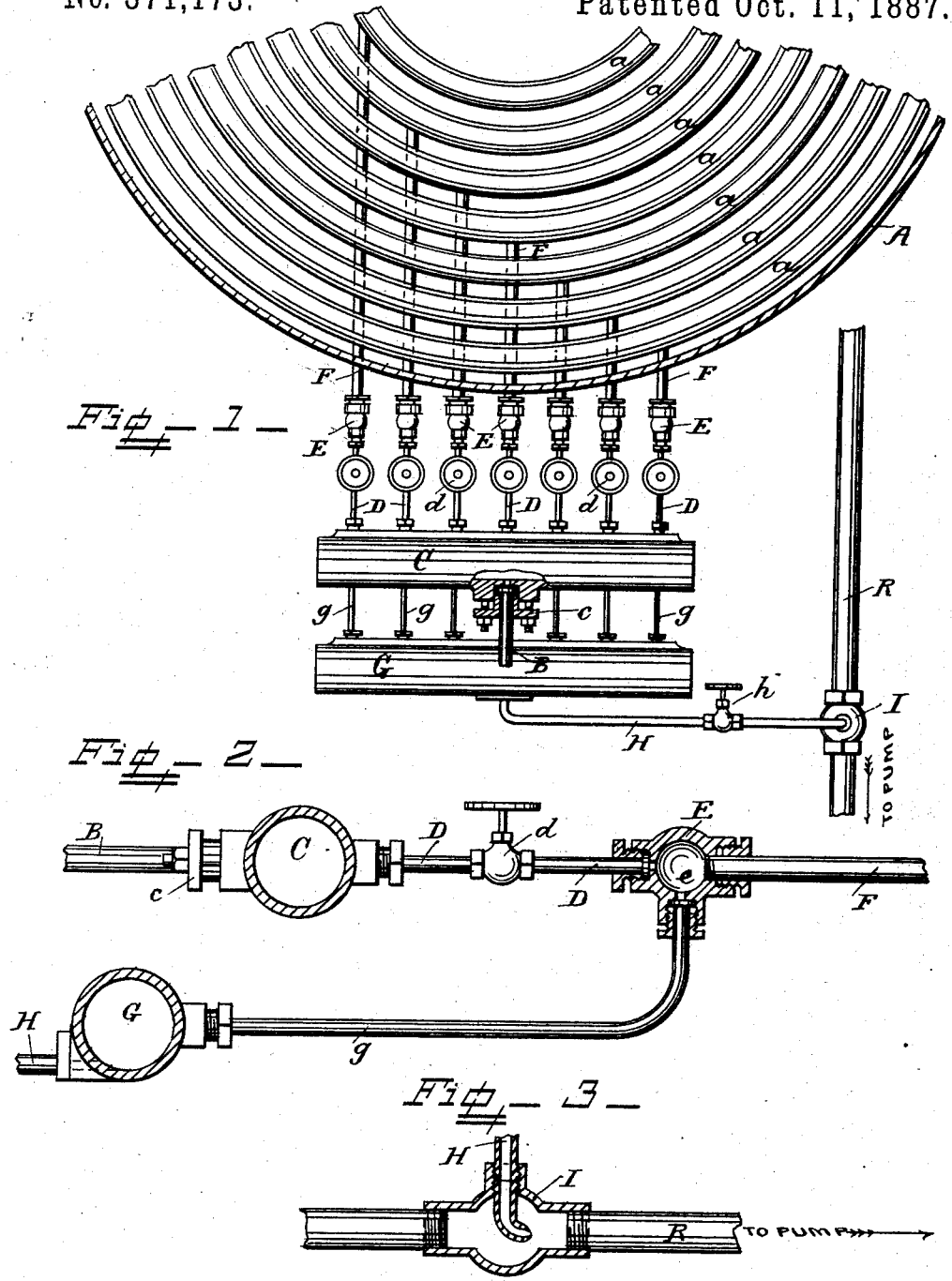

THOMAS H. BUTLER, OF HARRISBURG, PENNSYLVANIA.

WATER-SEPARATING ATTACHMENT FOR ICE-MACHINES.

SPECIFICATION forming part of Letters Patent No. 371,173, dated October 11, 1887.

Application filed June 13, 1887. Serial No. 241,201. (No model.)

*To all whom it may concern:*

Be it known that I, THOMAS H. BUTLER, a citizen of the United States, residing at Harrisburg, in the county of Dauphin and State of Pennsylvania, have invented certain new and useful Improvements in Water-Separating Attachments for Ice-Machines; and I do hereby declare the following to be a full, clear, and exact description of the invention, such as will enable others skilled in the art to which it appertains to make and use the same.

This invention relates to attachments for separating water from the anhydrous ammonia before it enters the coils of the brine-tank.

This invention is specially applicable to the ice-machine described in a separate application, Serial No. 240,905.

The object of this invention is to provide means for separating the water from the anhydrous ammonia at the point where it passes from its liquid to its gaseous condition, and, further, to provide means whereby all the coils in the brine tank may be uniformly supplied with gas.

In the drawings, Figure 1 is a sectional plan view of a portion of the brine-tank, showing the water-separating attachment applied to it. Fig. 2 is a vertical transverse section through the attachment to an enlarged scale. Fig. 3 is a vertical longitudinal section through the junction-piece by which the escape-pipe is connected to the suction-pipe of the pump.

A is the brine-tank provided with a series of coils, $a\ a\ a$, into which the anhydrous ammonia may expand into gas.

B is the anhydrous-ammonia-supply pipe, which is connected to the liquefier, as shown in the above-mentioned application for Letters Patent.

C is a manifold, to which the said pipe B is connected by the coupling-gland $c$.

D are the distributing-pipes for the liquid anhydrous ammonia, each of which is provided with a regulating-valve, $d$. One end of each of the pipes D is secured to the manifold C, and the other end is secured to a junction, E, provided with an enlarged cavity, $e$, in which the liquid anhydrous ammonia commences to expand into gas.

F are pipes of larger size than the pipes D, and which connect each one of the junctions E with its corresponding coil inside the brine-tank.

All the pipes through which the ammonia passes are provided with suitably-packed coupling-glands, to prevent leakage.

G is a water-drum or manifold situated at a lower level than the manifold C; and $g$, are pipes for draining off water, which connect the water-drum with the cavities $e$ of the junctions E.

H is the escape-pipe provided with the stop-valve $h$. This pipe is connected at one end to the water-drum, and has its other end bent round and inserted within the junction-piece I, which connects it to the suction-pipe R of the pump, so that the water escaping through the pipe H may be drawn into the suction-pipe.

All the water in the anhydrous ammonia separates from it automatically before it enters the coils in the brine tank and flows by gravity through the pipes $g$ into the water-drum, where it collects, and in which it remains at a temperature above freezing-point until allowed to flow into the suction-pipe of the pump by opening the valve $h$ in the escape-pipe.

If the water were allowed to pass on into the coils of the brine-tank, it would be frozen inside them by the intense cold caused by the expansion of the gas and would block up the coils with ice.

The partial expansion of the anhydrous ammonia into gas within the cavities $e$ allows the water to separate; but it is not a sudden or complete expansion, such as takes place within the coils, and the gas does not become cold enough to freeze the water within the said cavities. If too much liquid anhydrous ammonia passes through any of the valves $d$ for its coil to dispose of, the excess will flow through the pipe $g$, connected to its junction, and thence through the drum into any of the other coils which may be deficient in supply, the gas expanding away from the water in the cavities $e$ and the water remaining behind in the form of liquid.

What I claim is—

1. The combination, with the coil of an ice-machine brine-tank and the anhydrous-ammonia-supply pipe connected thereto, of a pipe for automatically separating the water from the gas, connected to the lower side of the said supply-pipe at the point where the liquid ammonia commences to expand into gas.

2. The combination of the coil of an ice-machine brine-tank and the anhydrous-ammonia-supply pipe connected thereto, of a junction provided with an enlarged cavity into which the liquid ammonia may commence to expand into gas, and a pipe connected to the lower side of the said junction for automatically removing the water therefrom.

3. The combination of an ice-machine brine-tank coil, a supply-pipe for liquid anhydrous ammonia provided with a regulating-valve, a junction having an enlarged cavity into which the liquid may commence to expand into gas, a pipe connecting the junction with the coil, a water drum placed at a lower level than the junction, a drain-pipe connecting the lower side of the junction with the drum, and an escape-pipe provided with a stop-valve, also connected to the said drum.

4. The combination of an ice-machine brine-tank coil, a supply pipe for liquid anhydrous ammonia provided with a regulating-valve, a junction having an enlarged cavity into which the liquid may commence to expand into gas, a pipe connecting the junction with the coil, a water-drum placed at a lower level than the junction, a drain-pipe connecting the lower side of the junction with the drum, an escape-pipe provided with a stop-valve, also connected to the said drum, and a junction-piece connecting the said escape-pipe with the suction-pipe of the pump.

5. The combination of a series of ice-machine brine-tank coils, a supply-pipe for liquid anhydrous ammonia, a manifold connected to the supply-pipe, small distributing pipes provided with regulating-valves, secured to the manifold, junctions having enlarged cavities into which the liquid may commence to expand into gas, secured to the distributing-pipes, large pipes connecting the said junctions with their respective coils, a water-drum placed below the level of the manifold, drain-pipes connecting the lower sides of each junction with the said water-drum, and an escape-pipe provided with a stop-valve, also secured to the drum, substantially as and for the purpose set forth.

In testimony whereof I affix my signature in presence of two witnesses.

THOMAS H. BUTLER.

Witnesses:
R. S. CARE,
JAMES I. CHAMBERLIN.